United States Patent
Nguyen

(10) Patent No.: US 11,511,995 B2
(45) Date of Patent: Nov. 29, 2022

(54) METHODS AND DEVICES FOR SYNTHESIS OF CARBON NANOTUBES

(71) Applicant: NTHERMA CORPORATION, Milpitas, CA (US)

(72) Inventor: Cattien V. Nguyen, San Jose, CA (US)

(73) Assignee: NTHERMA CORPORATION, Fremont, CA (US)

(*) Notice: Subject to any disclaimer, the term of this patent is extended or adjusted under 35 U.S.C. 154(b) by 0 days.

(21) Appl. No.: 16/668,022

(22) Filed: Oct. 30, 2019

(65) Prior Publication Data

US 2020/0062595 A1 Feb. 27, 2020

Related U.S. Application Data

(62) Division of application No. 16/107,182, filed on Aug. 21, 2018, now Pat. No. 10,640,382.

(Continued)

(51) Int. Cl.
*C01B 32/164* (2017.01)
*C01B 32/158* (2017.01)
(Continued)

(52) U.S. Cl.
CPC .......... *C01B 32/164* (2017.08); *C01B 32/158* (2017.08); *B82Y 30/00* (2013.01);
(Continued)

(58) Field of Classification Search
CPC . C01B 32/164; C01B 32/158; C01B 2202/30; C01B 2202/06; C01B 2202/08;
(Continued)

(56) References Cited

U.S. PATENT DOCUMENTS 7,160,531 B1    1/2007  Jacques et al.
9,499,904 B2 *  11/2016  Shibuya ............... C01B 32/16
(Continued)

FOREIGN PATENT DOCUMENTS

CN       104512879 A    4/2015
JP       2005-067916 A  3/2005
(Continued)

OTHER PUBLICATIONS

Guzmán de Villoria, Roberto, A. John Hart, and Brian L. Wardle. "Continuous high-yield production of vertically aligned carbon nanotubes on 2D and 3D substrates." ACS nano 5.6 (2011): 4850-4857.*

(Continued)

*Primary Examiner* — Richard M Rump
(74) *Attorney, Agent, or Firm* — Young Basile Hanlon & MacFarlane, P.C.

(57) ABSTRACT

Provided herein are methods and devices for production of carbon nanotubes (CNTs) which have high structural uniformity and low levels of impurities. The device includes, for example, a module for depositing catalyst on a substrate, a module for forming CNTs, a module for separating CNTs from the substrate, a module for collecting the CNTs and a module for continuously and sequentially advancing the substrate through the above modules. The method includes, for example, the steps of depositing catalyst on a moving substrate, forming carbon nanotubes on the substrate, separating carbon nanotubes from the substrate and collecting the carbon nanotubes from the surface, where the substrate moves sequentially through the depositing, forming, separating and collecting steps.

9 Claims, 11 Drawing Sheets

Related U.S. Application Data

(60) Provisional application No. 62/548,942, filed on Aug. 22, 2017, provisional application No. 62/548,945, filed on Aug. 22, 2017, provisional application No. 62/548,952, filed on Aug. 22, 2017.

(51) Int. Cl.
 *B82Y 40/00* (2011.01)
 *B82Y 30/00* (2011.01)

(52) U.S. Cl.
 CPC ........... *B82Y 40/00* (2013.01); *C01B 2202/06* (2013.01); *C01B 2202/08* (2013.01); *C01B 2202/30* (2013.01); *C01B 2202/34* (2013.01); *C01P 2002/82* (2013.01); *C01P 2002/88* (2013.01); *C01P 2006/80* (2013.01)

(58) Field of Classification Search
 CPC ..... C01B 2202/34; B82Y 40/00; B82Y 30/00; C01P 2002/82; C01P 2002/88; C01P 2006/80
 See application file for complete search history.

(56) References Cited

U.S. PATENT DOCUMENTS

| | | |
|---|---|---|
| 2004/0038556 A1 | 2/2004 | French et al. |
| 2013/0101495 A1* | 4/2013 | Peterson ............... B82Y 40/00 423/447.2 |
| 2014/0186550 A1* | 7/2014 | Cooper ............... B01J 37/0215 427/577 |
| 2015/0360956 A1 | 12/2015 | Tour et al. |

FOREIGN PATENT DOCUMENTS

| | | |
|---|---|---|
| JP | 2005-522340 A | 7/2005 |
| JP | 2006-305554 A | 11/2006 |
| RU | 2409711 C1 | 1/2011 |
| WO | 03086961 A2 | 10/2003 |
| WO | 2015/032646 A1 | 3/2015 |

OTHER PUBLICATIONS

Kara, M. H., et al. "Influence of catalyst thickness and temperature gradient on MWCNT growth and morphology in TCVD process." TENCON 2011-2011 IEEE Region 10 Conference. IEEE, 2011.*

Wall, The Raman Spectroscopy of Graphene and the Determination of Layer Thickness, Thermo Fisher Scientific Application Note: 52252, pp. 1-4 (2011) (Year: 2011).

Zhang Q et al: "Vertically aligned carbon nanotube arrays grown on a lamellar catalyst by fluidized bed catalytic chemical vapor deposition" Carbon, Elsevier Oxford, GB, vol. 47, No. 11, Sep. 1, 2009 (Sep. 1, 2009), pp. 2600-2610.

Koumoulos Elias P et al: "Surface analysis and mechanical behaviour mapping of vertically aligned CNT forest array through nanoindentation" Applied Surface Science, Elsevier, Amsterdam, NL, vol. 396, Nov. 2, 2016 (Nov. 2, 2016), pp. 681-687.

Rasheed A K et al: "Graphene based nanofluids and nanolubricants—Review of recent developments", Renewable and Sustainable Energy Reviews, Elseviers Science, New York, NY, US, vol. 63, Jun. 1, 2016 (Jun. 1, 2016), pp. 346-362.

Huang, J., Zhang, Q., Zhao, M. et al. A review of the large-scale production of carbon nanotubes: The practice of nanoscale process engineering. Chin. Sci. Bull. 57, 157-166 (2012). https://doi.org/10.1007/s11434-011-4879-z.

Tabulina et al., Purification Features of Carbon Nanotubes From Impurities After Their Synthesis; Izv. Vyssh. Uchebn. Zaved. Khim. Khim. Tekhnol. 2017. V.60. N 6; 6 pages; Apr. 20, 2017 considered on nature of english abstract only.

Wang, et al., The large-scale production of carbon nanotubes in a nano-agglomerate fluidized-bed reactor, Chemical Physics Letters 2002; 364: 568-572 (Year: 2002).

Shukrullah, Shazia, Mohamed, Norani Muti, Shaharun, Maizatul Shima and Naz, Muhammad Yasin. "Study of surface defects and crystallinity of MWCNTs growth in FCCVD" Science and Engineering of Composite Materials, vol. 24, No. 6, 2017, pp. 845-851.

Wondong Cho, Mark Schulz, Vesselin Shanov, Growth and characterization of vertically aligned centimeter long CNT arrays, Carbon, vol. 72, 2014, pp. 264-273, ISSN 0008-6223, https://doi.org/10.1016/j.carbon.2014.01.074. (https://www.sciencedirect.com/science/article/pii/S000862231400133X).

* cited by examiner

METHODS AND DEVICES FOR SYNTHESIS OF CARBON NANOTUBES

CROSS REFERENCE TO RELATED APPLICATIONS

This application is a divisional of U.S. patent application Ser. No. 16/107,182 under 35 U.S.C. § 121 and claims priority under 35 U.S.C. § 119 (e) from U.S. Provisional Application Ser. No. 62/548,942, filed Aug. 22, 2017, U.S. Provisional Application Ser. No. 62/548,945, filed Aug. 22, 2017 and U.S. Provisional Application Ser. No. 62/548,952, filed Aug. 22, 2017 which are all hereby incorporated by reference in their entirety.

FIELD

Provided herein are methods and devices for production of carbon nanotubes (CNTs) which have high structural uniformity and low levels of impurities. The device includes, for example, a module for depositing catalyst on a substrate, a module for forming CNTs, a module for separating CNTs from the substrate, a module for collecting the CNTs and a module for continuously and sequentially advancing the substrate through the above modules. The method includes, for example, the steps of depositing catalyst on a moving substrate, forming carbon nanotubes on the substrate, separating carbon nanotubes from the substrate and collecting the carbon nanotubes from the surface, where the substrate moves sequentially through the depositing, forming, separating and collecting steps.

BACKGROUND

Carbon nanotubes (CNTs) are an allotrope of carbon, having cylindrical structure and diameters, which range from less than about 1 nm to about 100 nm in diameter. CNTs have many potentially applications in a wide variety of industries due to many extraordinary properties coupled with nanometer-scale size. For example, properties such as high thermal conductivity, electrical conductivity, mechanical strength and flexibility, coupled with high-aspect-ratio are responsible for the increasing number of CNT applications.

Current CNT manufacturing methods typically produce CNTs with significant impurities such as, for example, metal catalysts and amorphous carbon. Purification steps are typically required after synthesis of CNTs via conventional manufacturing methods, to provide relatively pure carbon nanotubes. CNT purification steps require large and expensive chemical plants which makes producing large quantities of CNTs of greater than 90% purity extremely costly. Furthermore, present CNT manufacturing methods produce CNTs with low structural uniformity (i.e., CNTs of variable lengths).

Accordingly, what is needed are new methods and devices for providing high quality and inexpensive CNTs with high structural uniformity and low levels of impurities.

SUMMARY

The present invention satisfies these and other needs by providing, in one aspect, methods for synthesizing carbon nanotubes. In some embodiments, the nanotubes are multi-walled carbon nanotubes. In other embodiments, the nanotubes are single-walled carbon nanotubes. In still other embodiments, the nanotubes are a mixture of single-walled carbon nanotubes and multi-walled carbon nanotubes. The methods include the steps of depositing catalyst on a constantly moving substrate, forming carbon nanotubes on the substrate, separating carbon nanotubes from the substrate and collecting the carbon nanotubes where the substrate moves sequentially through the depositing, forming, separating steps and collecting steps.

In another aspect, devices for synthesizing carbon nanotubes are provided. In some embodiments, the nanotubes are multi-walled carbon nanotubes. In other embodiments, the nanotubes are single-walled carbon nanotubes. In still other embodiments, the nanotubes are a mixture of single-walled carbon nanotubes and multi-walled carbon nanotubes. The devices include a catalyst module which deposits catalyst on a substrate, a nanotube synthesis module which forms carbon nanotubes on the substrate, a separation module which removes carbon nanotubes from the substrate, a collection module which collects the carbon nanotubes and a transport module for advancing the substrate through the catalyst module, the nanotube module, the separation module and the collection module in sequential order.

DETAILED DESCRIPTION

Figure 1:
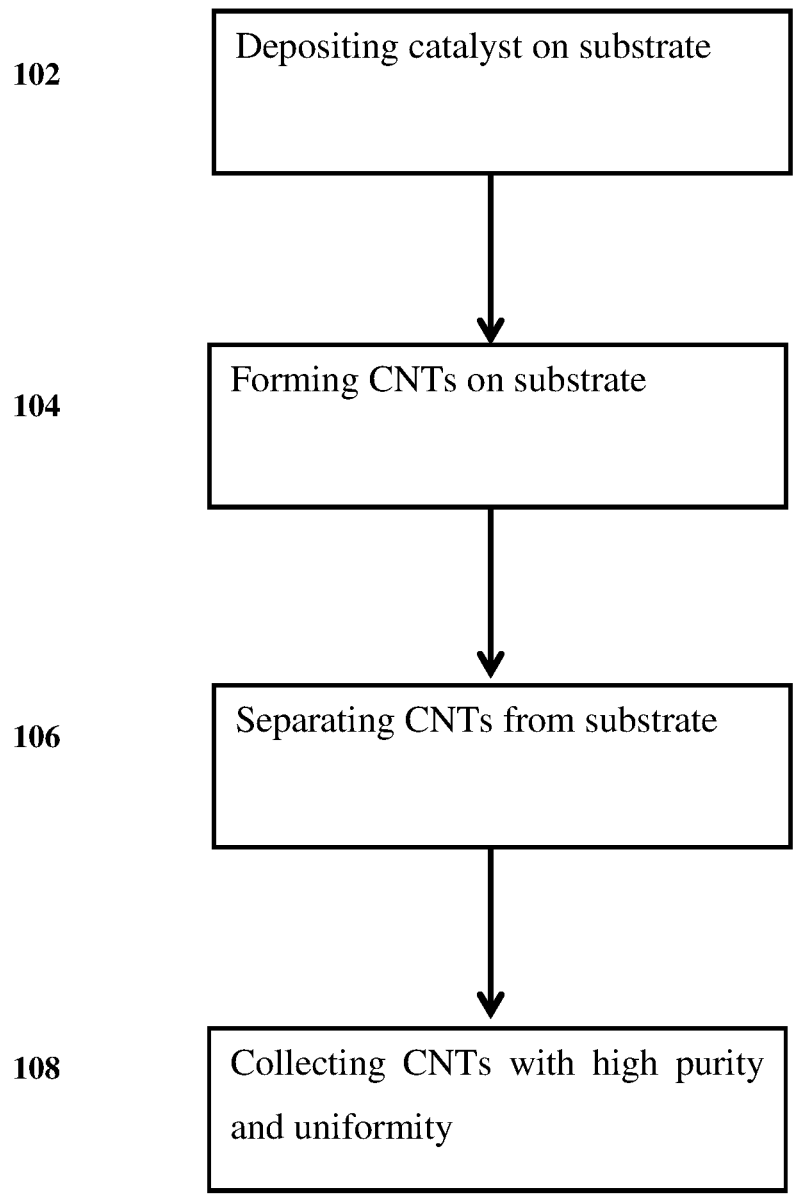
FIG. 1 illustrates an exemplary flowchart for synthesis of carbon nanotubes, which includes the steps of depositing catalyst on a substrate; forming carbon nanotubes on a substrate; separating carbon nanotubes from the substrates; and collecting carbon nanotubes of high purity and structural uniformity

Unless defined otherwise, all technical and scientific terms used herein have the same meaning as is commonly understood by one of ordinary skill in the art to which this invention belongs. If there is a plurality of definitions for a term herein, those in this section prevail unless stated otherwise.

As used herein "carbon nanotubes" refer to allotropes of carbon with a cylindrical structure. Carbon nanotubes may have defects such as inclusion of C5 and/or C7 ring structures, such that the carbon nanotube is not straight, may include coiled structures and may contain randomly distributed defected sites in the C—C bonding arrangement. Carbon nanotubes may include one or more concentric cylindrical layers. The term "carbon nanotubes" as used herein includes single walled carbon nanotubes, double walled carbon nanotubes multiwalled carbon nanotubes alone in purified form or as mixtures thereof. In some embodiments, the carbon nanotubes are multi-walled. In other embodiments, the carbon nanotubes are single-walled. In still other embodiments, the carbon nanotubes are double-walled. In still other embodiments, the carbon nanotubes are a mixture of single-walled and multi-walled nanotubes. In still other embodiments, the carbon nanotubes are a mixture of single-walled and double-walled nanotubes. In still other embodiments, the carbon nanotubes are a mixture of double-walled and multi-walled nanotubes. In still other embodiments, the carbon nanotubes are a mixture of single-walled, double-walled and multi-walled nanotubes.

As used herein "multi-walled carbon nanotubes" refer to carbon nanotubes composed of multiple concentrically nested graphene sheets with interlayer distances like graphite.

As used herein "double-walled carbon nanotubes" refer to carbon nanotubes with two concentrically nested graphene sheets As used herein "single-walled carbon nanotubes" refer to carbon nanotubes with a single cylindrical graphene layer.

As used herein "vertically-aligned carbon nanotubes" refer to an array of carbon nanotubes deposited on a substrate wherein the structures of carbon nanotubes are physically aligned perpendicular to the substrate.

As used herein "catalysts" or "metal catalysts" refer to a metal or a combination of metals such as Fe, Ni, Co, Cu, Ag, Pt, Pd, Au, etc. which are used in the breakdown of hydrocarbon gases and aid in the formation of carbon nanotubes by chemical vapor deposition process.

As used herein "chemical vapor deposition" refers to plasma-enhanced chemical vapor deposition, thermal chemical vapor deposition, alcohol catalytic CVD, vapor phase growth, aerogel supported CVD and laser assisted CVD.

As used herein "plasma-enhanced chemical vapor deposition" refers to the use of plasma (e.g., glow discharge) to transform a hydrocarbon gas mixture into excited species which deposit carbon nanotubes on a surface.

As used herein "thermal chemical vapor deposition" refers to the thermal decomposition of hydrocarbon vapor in the presence of a catalyst which may be used to deposit carbon nanotubes on a surface.

As used herein "physical vapor deposition" refers to vacuum deposition methods used to deposit thin films by condensation of a vaporized of desired film material onto film materials and includes techniques such as cathodic arc deposition, electron beam deposition, evaporative deposition, pulsed laser deposition and sputter deposition.

As used herein "forming carbon nanotubes" refers to any vapor deposition process, including chemical, plasma and physical vapor deposition methods described herein, for forming carbon nanotubes on a substrate in a reaction chamber.

Carbon nanotubes are relatively new materials with exceptional physical properties, such as superior current carrying capacity, high thermal conductivity, good mechanical strength, and large surface area, which are advantageous in several applications. Carbon nanotubes possess exceptional thermal conductivity with a value as high as 3000 W/mK which is only lower than the thermal conductivity of diamond. Carbon nanotubes are mechanically strong, thermally stable above 400° C. under atmospheric conditions and have reversible mechanical flexibility particularly when vertically aligned. Accordingly, carbon nanotubes can mechanically conform to different surface morphologies because of this intrinsic flexibility. Additionally, carbon nanotubes have a low thermal expansion coefficient and retain flexibility in confined conditions under elevated temperatures.

Economically providing carbon nanotubes, in a controlled manner with practical and simple integration and/or packaging is essential for implementing many carbon nanotube technologies. Devices and methods which provide large quantities of carbon nanotubes of exceptional purity and uniform length are provided herein. The CNTs synthesized herein do not require costly post-synthesis purification.

Briefly the general feature of the method are as follows. First, a metal catalyst is coated on the surface and the substrate is heated at high temperature. Then, catalyst is then coated on the surface of the substrate at high temperature to provide nanoparticles of catalyst on the substrate, which serve as initiation site for CNT synthesis. CNTs are synthesized by supplying a carbon source to the catalyst. Accordingly, a mixture of carbon source and carrier gas is flowed into a chamber which includes heated substrate coated with catalyst to provide substrate with attached CNTs. Finally, synthesized CNTs are extracted from the substrate and collected. Optionally, the substrate coated with catalyst is regenerated.

In some embodiments, the catalyst is deposited on the substrate by sputtering, evaporation, dip coating, print screening, electrospray, spray pyrolysis or ink jet printing. The catalyst may be then chemically etched or thermally annealed to induce catalyst particle nucleation. The choice of catalyst can lead to preferential growth of single walled CNTs over multi-walled CNTs.

In some embodiments, the catalyst is deposited on a substrate by immersing the substrate in a solution of the catalyst. In other embodiments, the concentration of the catalyst solution in aqueous or organic solvents water is between about 0.01% and about 20%. In still other embodiments, the concentration of the catalyst solution in aqueous or organic solvents water is between about 0.1% and about 10%. In still other embodiments, the concentration of the catalyst solution in aqueous or organic solvents water is between about 1% and about 5%.

The temperature of the chamber where CNTs are synthesized should be a temperature lower than the melting temperature of substrate, lower than the decomposition temperate of carbon source and higher than the decomposition temperature of the catalyst raw material. The temperature range for growing multi-walled carbon nanotubes is between about 600° C. to about 900° C., while the temperature range for growing single walled CNTs is between about 700° C. to about 1100° C.

In some embodiments, CNTs are formed by chemical vapor deposition on a substrate containing metal catalysts for the growth of CNTs. It is important to note that continuous CNT formation on a constantly moving substrate allows the CNTs to have uniform lengths. Typical feedstocks include, but are not limited to, carbon monoxide, acetylene, alcohols, ethylene, methane, benzene, etc. Carrier gases are inert gases such as for example, argon, helium, or nitrogen, while hydrogen is a typical reducing gas. The composition of the gas mixture and duration of substrate exposure regulates the length of synthesized CNTs. Other methods known to those of skill in the art such as, for example, the physical vapor deposition methods described, supra, the method of Nikolaev et al., Chemical Physics Letter, 1999, 105, 10249-102:56 and nebulized spray pyrolysis (Rao et al., Chem. Eng. Sci. 59, 466, 2004) may be used in the methods and devices described herein. Conditions well known to those of skill in the art may be used to prepare carbon nanotubes using any of the methods above.

Referring now to FIG. 1, a method for synthesizing carbon nanotubes is provided. The method may be performed in discrete steps, as illustrated in FIG. 1. Those of skill in the art will appreciate that any combination of the steps can be performed continuously, if desired. A catalyst is deposited on a substrate at 102, carbon nanotubes are formed on the substrate at 104, carbon nanotubes are separated from the substrate at 106 and the carbon nanotubes are collected at 108.

Figure 2:
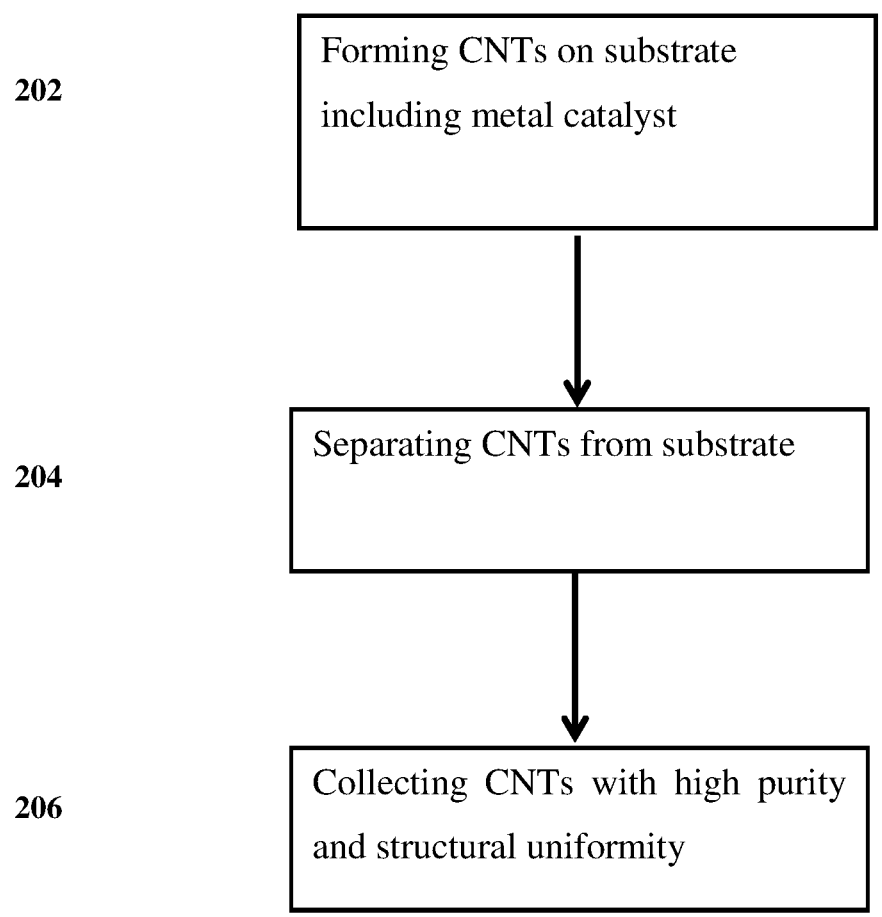
FIG. 2 illustrates an exemplary flowchart for synthesis of carbon nanotubes, which includes the steps of forming carbon nanotubes on a substrate; separating carbon nanotubes from the substrates; and collecting carbon nanotubes of high purity and structural uniformity.

Referring now to FIG. 2, another method for synthesizing carbon nanotubes is provided. The method may be performed in discrete steps, as illustrated in FIG. 2. Those of skill in the art will appreciate that any combination of the steps can be performed continuously, if desired. Carbon nanotubes are formed on a substrate, which already contains catalyst at 202, carbon nanotubes are separated from the substrate at 204 and the carbon nanotubes are collected at 206.

Figure 3:
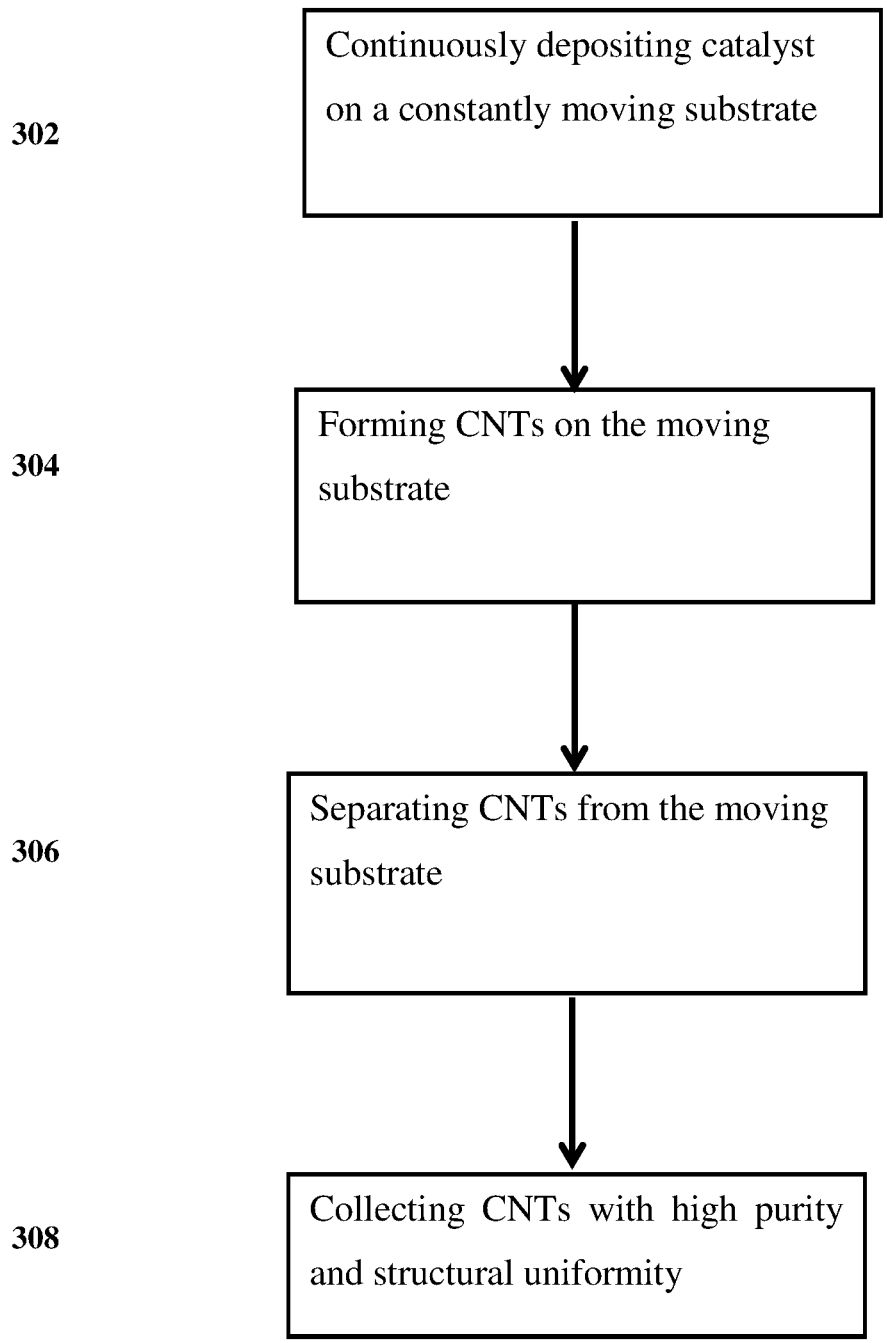
FIG. 3 illustrates an exemplary flowchart for continuous synthesis of carbon nanotubes, which includes the steps of continuously depositing catalyst on a constantly moving substrate; forming CNTs on the moving substrate; separating CNTs from the moving substrate; and collecting carbon nanotubes of high purity and structural uniformity.

Referring now to FIG. 3, another method for synthesizing carbon nanotubes is provided. The method is performed continuously. A catalyst is continuously deposited on a moving substrate at 302, carbon nanotubes are continuously formed on the moving substrate at 304, carbon nanotubes are continuously separated from the substrate at 306 and the carbon nanotubes are continuously collected at 308. The substrate may be cycled through the steps described herein once or optionally, many times, such as, for example, more than 50 time, more than 1,000 time or more than 100,000 times.

Figure 4:
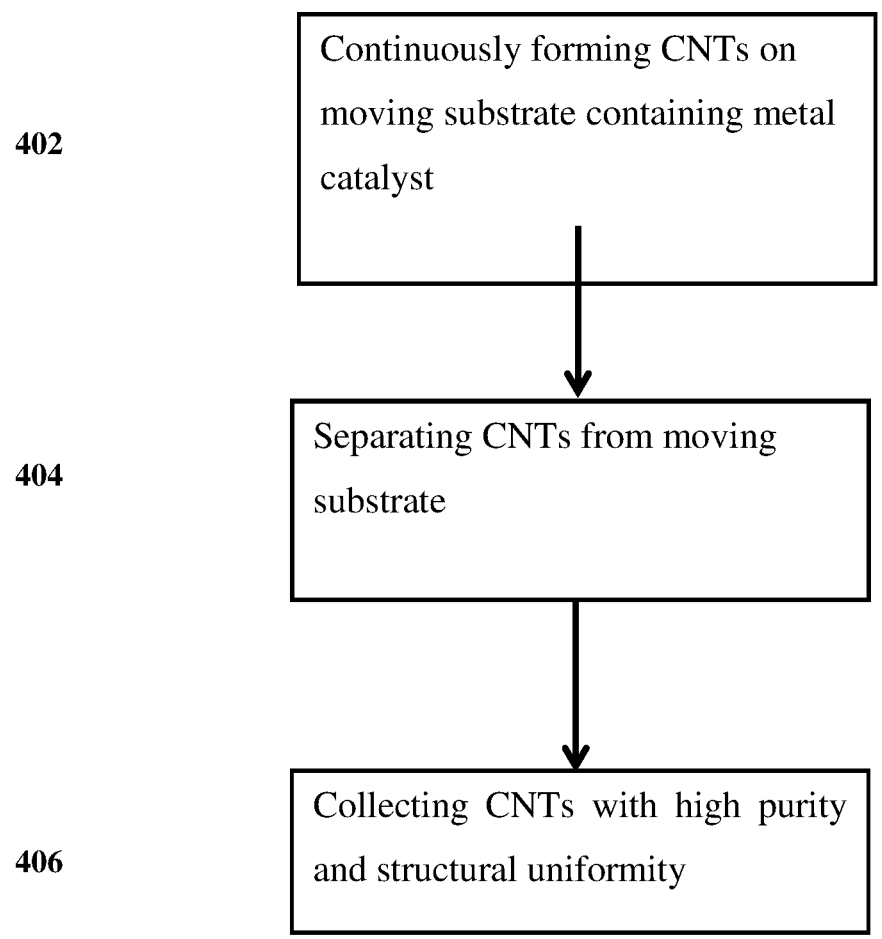
FIG. 4 illustrates an exemplary flowchart for continuous synthesis of carbon nanotubes, which includes the steps of forming CNTs on the moving substrate containing metal substrate; separating CNTs from the moving substrate; and collecting carbon nanotubes of high purity and structural uniformity.

Referring now to FIG. 4, another method for synthesizing carbon nanotubes is provided. The method is performed continuously as illustrated. Carbon nanotubes are continuously formed on the moving substrate which already contains catalyst at 402, carbon nanotubes are continuously separated from the substrate at 404 and the carbon nanotubes are continuously collected at 406. In some embodiments, the substrate is cycled through the deposition, forming and separating steps more than 50 times, more than 1,000 time or more than 100,0000 times.

Deposition of CNTs on a moving substrate provides CNTs that are of both high purity and high length uniformity. Moreover, controlling process conditions enables the customization of CNT length. For example, variation of the rate of the moving substrate through the production process modifies CNT length; faster rates though the CNT deposition module produces CNT of shorter length, while slower rates will produce CNT of longer length.

In some embodiments, the substrate is completely covered by metal foil. In these embodiments, the substrate may be any material stable to conditions of catalyst deposition and CNT synthesis. Many such material are known to those of skill in the art and include, for example, carbon fibers, carbon foil, silicon, quartz, etc. In other embodiments, the substrate is a metal foil which can be continuously advanced through the various steps of the methods described herein.

In some embodiments, the thickness of the metal foil is greater than 10 µM. In other embodiments, the thickness of the metal foil is between about 10 µM and about 500 µM. In still other embodiments, the thickness of the metal form is between about 500 µM and about 2000 In still other embodiments, the thickness of the metal foil is between about 0.05 and about 100 cm. In other embodiments, the thickness of the metal foil is between about 0.05 µM and about 100 cm. In other embodiments, the thickness of the metal foil is between about 0.05 mm and about 5 mm. In still other embodiments, the thickness of the metal foil is between about 0.1 mm and about 2.5 mm. In still other embodiments, the thickness of the metal foil is between about 0.5 mm and about 1.5 mm. In still other embodiments, the thickness of the metal foil is between about 1 mm and about 5 mm. In still other embodiments, the thickness of the metal foil is between about 0.05 mm and about 1 mm. In still other embodiments, the thickness of the metal foil is between about 0.05 mm and about 0.5 mm. In still other embodiments, the thickness of the metal foil is between about 0.5 mm and about 1 mm. In still other embodiments, the thickness of the metal foil is between about 1 mm and about 2.5 mm. In still other embodiments, the thickness of the metal foil is between about 2.5 mm and about 5 mm. In still other embodiments, the thickness of the metal foil is between about 100 and about 5 mm. In still other embodiments, the thickness of the metal foil is between about 10 µM and about 5 mm. In still other embodiments, the thickness of the metal foil is greater than 100 In still other embodiments, the thickness of the metal foil is less than 100 µM.

In some embodiments, the metal foil includes iron, nickel, aluminum, cobalt, copper, chromium, gold, silver, platinum, palladium or combinations thereof. In other embodiments, the metal foil includes iron, nickel, cobalt, copper, gold or combinations thereof. In some embodiments, the metal foil may be coated with organometallocenes, such as, for example, ferrocene, cobaltocene or nickelocene.

In some embodiments, the metal foil is an alloy of two or more of iron, nickel, cobalt, copper, chromium, aluminum, gold or combinations thereof. In other embodiments, the metal foil is an alloy of two or more of iron, nickel, cobalt, copper, gold or combinations thereof.

In some embodiments, the metal foil is high temperature metal alloy. In other embodiments, the metal foil is stainless steel. In still other embodiments, the metal foil is a high temperature metal alloy on which a catalyst is deposited for growing carbon nanotubes. In still other embodiments, the metal foil is stainless steel on which a catalyst is deposited for growing carbon nanotubes.

In some embodiments, the metal foil is a metal or combination of metals which are thermally stable at greater than 400° C. In other embodiments, the metal foil is a metal or combination of metals which are thermally stable at greater than 500° C., greater than 600° C., greater than 700° C. or greater than 1000° C. In some of the above embodiments, the combination of metals is stainless steel.

In some embodiments, the metal foil has a thickness of less than about 100 μM and a surface root mean square roughness of less than about 250 nm. In some embodiments, the metal foil has a thickness of greater than about 100 μM and a surface root mean square roughness of less than about 250 nm. In still other embodiments, the metal foil has a thickness of less than about 100 μM and a surface root mean square roughness of less than about 250 nm and includes iron, nickel, cobalt, copper, gold or combinations thereof. In still other embodiments, the metal foil has a thickness of greater than about 100 μM and a surface root mean square roughness of less than about 250 nm and includes iron, nickel, cobalt, copper, gold or combinations thereof. In still other embodiments, the metal foil has a thickness of less than about 100 μM and a surface root mean square roughness of less than about 250 nm and includes a catalyst film. In still other embodiments, the metal foil has a thickness of greater than about 100 μM and a surface root mean square roughness of less than about 250 nm and includes a catalyst film. In some of the above embodiments, the root mean square roughness is less than about 100 nm.

In some embodiments, the substrate continuously advances through the steps of the above methods at a rate greater than 0.1 cm/minute. In other embodiments, the substrate continuously advances through the steps of the above methods at a rate greater than 0.05 cm/minute. In sill other embodiments, the substrate continuously advances through the steps of the above methods at a rate greater than 0.01 cm/minute. In still other embodiments, the substrate is cycled through the deposition, forming, separating and collecting steps more than 10 times 50 times, more than 1,000 time or more than 100,0000 times.

In some embodiments, the substrate is wider than about 1 cm. In other embodiments, the substrate has a length greater than 1 m, 10 m, 100 m, 1,000 m or 10,000 m. In some of these embodiments, the substrate is a metal foil.

In some embodiments, carbon nanotubes are formed on all sides of the substrate. In other embodiments, carbon nanotubes are formed on both sides of the metal foil.

In some embodiments, the concentration of catalyst deposited on the substrate is between about 0.001% and about 25%. In other embodiments, the concentration of catalyst deposited on the substrate is between about 0.1% and about 1%. In still other embodiments, the concentration of catalyst deposited on the substrate is between about 0.5% and about 20%.

In some embodiments, the concentration of carbon nanotube on the substrate is between about 1 nanotube per μM and about 50 nanotubes per μM. In other embodiments, the concentration of carbon nanotube on the substrate is between about 10 nanotubes per μM and about 500 nanotubes per μM.

In some embodiments, the CNTs are separated from the substrate by mechanical removal of the CNTs from the surface of the substrate. In other embodiments, separation of CNTs from the substrate involves removing the CNTs from the surface of the substrate with a mechanical tool (e.g., a blade, an abrasive surface, etc.) thus yielding high purity CNTs with little or no metal impurities, which do not require any additional purification. In still other embodiments, separation of CNTs from the substrate involves chemical methods that disrupt adhesion of CNTs to the substrate. In yet other embodiments, ultrasonication disrupts adhesion of CNTs to the substrate. In still other embodiments, pressurized gas flow disrupts adhesion of CNTs to the substrate. The combination of depositing CNTs on a substrate and separating CNTs from the substrate provides CNT products of uniform length free of catalyst and amorphous carbon impurities.

The CNTs can be collected in or on any convenient object, such as for example, an open vessel, a wire mesh screen, a solid surface, a filtration device, etc. The choice of collection device will usually be correlated with the method used to disrupt adhesion of CNTs to the substrate.

In some embodiments, the carbon nanotubes are randomly aligned. In other embodiments, the carbon nanotubes are vertically aligned. In still other embodiments, the uniform length is on average about 50 μM, about 100 μM, about 150 μM or about 200 μM. In still other embodiments, the uniform length can range from 50 μM to 2 cm. In general, the uniform length is about +/−10% of the stated length. Accordingly, a sample with a uniform length of about 100 μM will include nanotubes of length between 90 μM and 110 μM. In still other embodiments, carbon nanotubes are vertically aligned and are of uniform length.

In some embodiments, the density of the carbon nanotubes is between about 2 mg/cm2 and about 1 mg/cm2. In other embodiments, the density of the carbon nanotubes between about 2 mg/cm2 and about 0.2 mg/cm2.

In some embodiments, vertically aligned carbon nanotubes have a thermal conductivity of greater than about 50 W/mK. In other embodiments, vertically aligned carbon nanotubes have a thermal conductivity of greater than about 70 W/mK.

In some embodiments, the thickness of the vertically aligned carbon nanotubes is between than about 100 μm and about 500 μm. In other embodiments, the thickness of the vertically aligned carbon nanotubes is less than about 100 μm.

In some embodiments, the carbon nanotubes are of greater than 90%, 95%, 99%, 99.5% or 99.9% purity. In other embodiments, the carbon nanotubes are of greater than 90%, 95%, 99%, 99.5% or 99.9% purity and are of uniform length of about 50 μM, about 100 μM, about 150 μM or about 200 μM. In still other embodiments, the carbon nanotubes are vertically aligned, of greater than 90%, 95%, 99%, 99.5% or 99.9% purity and are of uniform length of about 50 μM, about 100 μM, about 150 μM or about 200 μM.

In some embodiments, the tensile strength of the carbon nanotubes is between about 11 GPa and about 63 GPa. In other embodiments, the tensile strength of the carbon nanotubes is between about 20 GPa and about 63 GPa. In still other embodiments, the tensile strength of the carbon nanotubes is between about 30 GPa and about 63 GPa. In still other embodiments, the tensile strength of the carbon nanotubes is between about 40 GPa and about 63 GPa. In still other embodiments, the tensile strength of the carbon nanotubes is between about 50 GPa and about 63 GPa. In still other embodiments, the tensile strength of the carbon nanotubes is between about 20 GPa and about 45 GPa.

In some embodiments, the elastic modulus of the carbon nanotubes is between about 1.3 TPa and about 5 TPa. In other embodiments, the elastic modulus of the carbon nanotubes is between about 1.7 TPa and about 2.5 TPa. In still other embodiments, the elastic modulus of the carbon nanotubes is between about 2.7 TPa and about 3.8 TPa.

Figure 5:
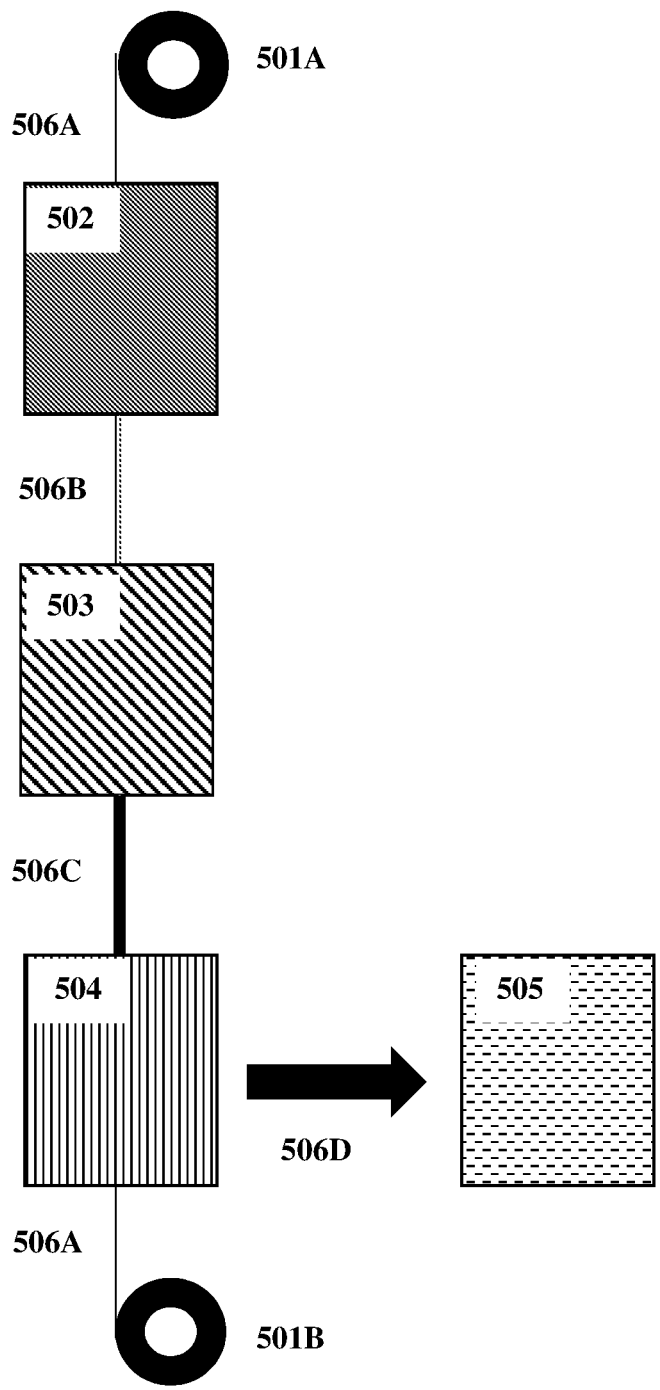
FIG. 5 schematically illustrates a device for the continuous synthesis of carbon nanotubes, which includes various modules sequentially disposed such as a transport module for advancing the substrate through the modules; a catalyst module; a nanotube synthesis module; a separation module; and a collection module.

Referring now to FIG. 5, a device for continuously synthesizing CNTs is provided. Transport module includes drums 501A and 501B, which are connected by substrate 506. Substrate 506 continuously moves from drum 501A through catalyst module 502, nanotube synthesis module 503 and separation module 504 to drum 501B. Note that naïve substrate 506A, is modified by catalyst module 502 to provide substrate 506B which includes catalyst. In some embodiments, catalyst module 502 is a solution of catalyst in which substrate 506A is immersed. Carbon nanotubes are continuously formed on substrate 506B during transit through nanotube synthesis module 503 to yield substrate 506C, which includes carbon nanotubes. In some embodiments, nanotube synthesis module 503 is a CVD chamber. Substrate 506C is continuously processed by separation module 504 and stripped of attached carbon nanotubes to yield substrate 506A, which is then collected by drum 501B. In some embodiments, separation module 504 includes a blade which mechanically shears the newly formed CNTs from substrate 506C. Note that carbon nanotubes removed from substrate 506C are continuously collected by process 506D at collection module 505. In some embodiments, collection module 505 is simply an empty vessel situated appropriately to collect the CNTs separated from the substrate surface by separation module 504. In the above embodiment, substrate 506 is not recycled during the production run.

Figure 6:
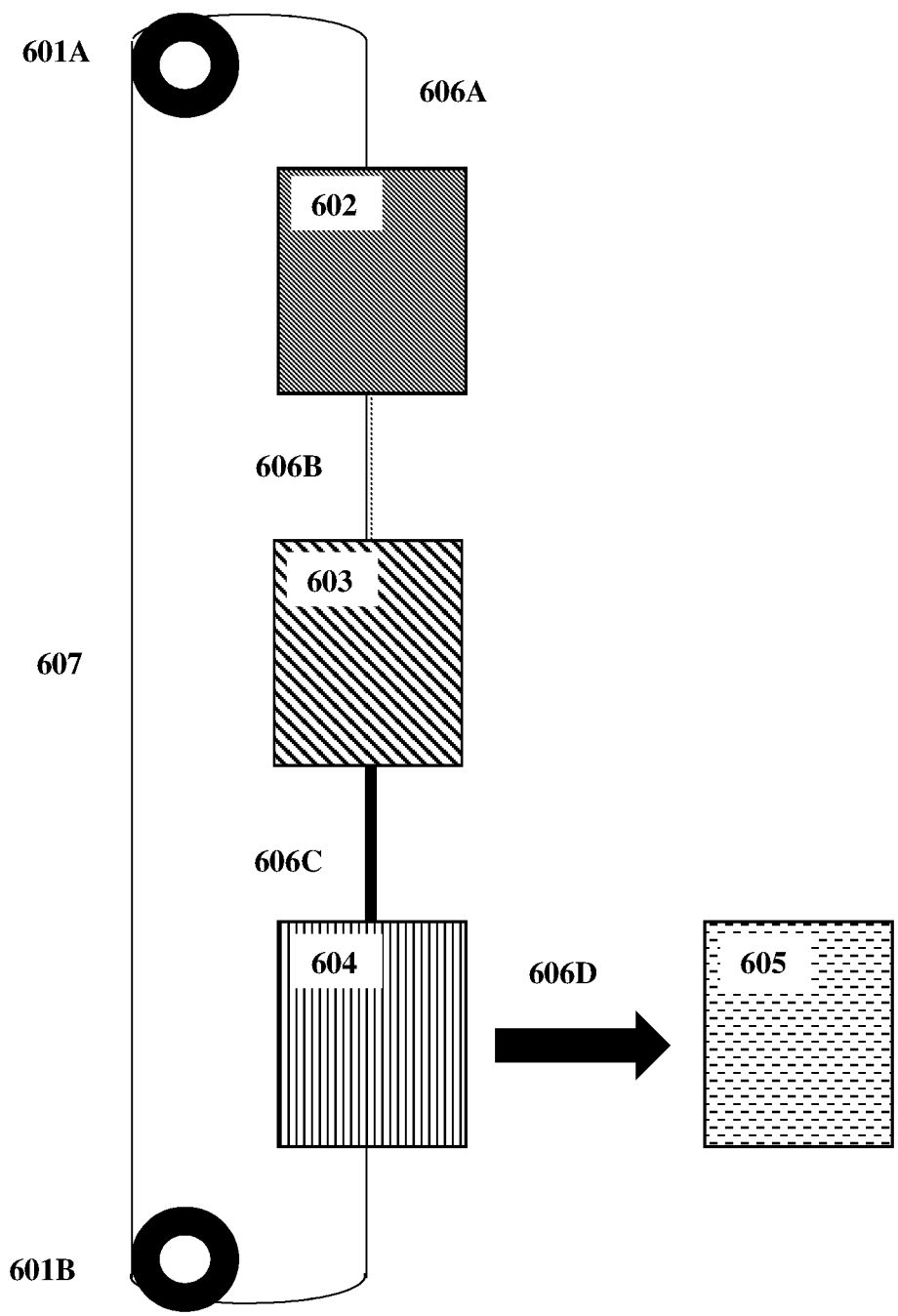
FIG. 6 schematically illustrates a device with closed-loop feeding of substrate for the continuous synthesis of carbon nanotubes which includes various modules sequentially disposed such as a transport module for advancing the substrate through the modules; a catalyst module; a nanotube synthesis module; a separation module; and a collection module.

Referring now to FIG. 6, another device for continuously synthesizing CNTs is schematically illustrated. Transport module includes drums 601A and 601B, which are connected by substrate 606. Substrate 606 continuously moves from drum 601A through catalyst module 602, nanotube synthesis module 603 and separation module 604 to drum 601B. Note that naïve substrate 606A, is modified by catalyst module 602 to provide substrate 606B which contains catalyst. In some embodiments, catalyst module 502 is a solution of catalyst in which substrate 606A is immersed. Carbon nanotubes are continuously formed on substrate 606B during transit through nanotube synthesis module 603 to yield substrate 506C. In some embodiments, nanotube synthesis module 603 is a CVD chamber. Substrate 606C is continuously processed by separation module 604 and stripped of attached carbon nanotubes to yield substrate 606A, which is then collected by drum 601B. In some embodiments, separation module 604 includes a blade which mechanically shears the newly formed CNTs from substrate 606C. Note that carbon nanotubes removed from substrate 606C are continuously collected by process 606D at collection module 605. In some embodiments, collection module 605 is simply an empty vessel situated appropriately to collect the CNTs separated from the substrate surface by separation module 604. In the above embodiment, the substrate is recycled through the production run at least once.

Although many of the above embodiments have been described as synthesizing nanotubes continuously, those of skill in the art will appreciate that the methods and devices described herein may be practiced discontinuously.

Figure 7:
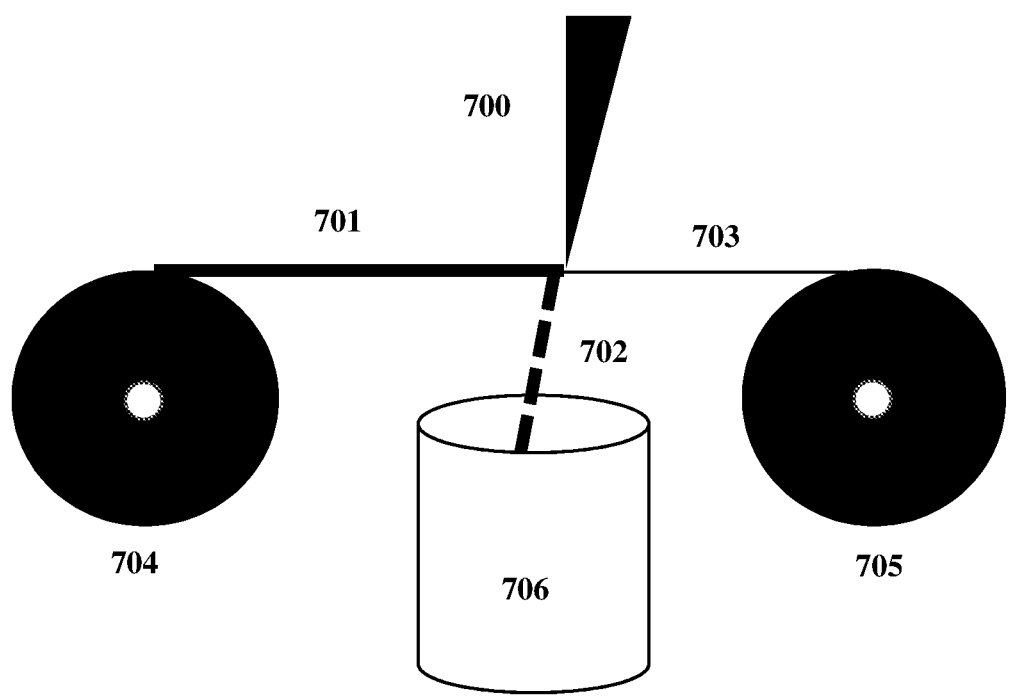
FIG. 7 schematically illustrates an exemplary separation module.

FIG. 7 schematically illustrates an exemplary separation module. Drum 704 advances substrate 701, which has been processed by catalyst module (not shown) and carbon nanotube deposition module (not shown) and which is covered with carbon nanotubes to tool 700, which removes carbon nanotubes 702 to provide substrate 703 devoid of carbon nanotubes. In some embodiments, tool 700 is a cutting blade. The substrate 703 is collected by drum 705. Carbon nanotubes 702 are collected in container 706. Substrate 701, as illustrated, is coated on only one side with carbon nanotubes. Those of skill in the art will appreciate that nanotubes can be grown on both sides of the substrate and that a substrate with both sides coated can be processed in a manner analogous to that described above.

Figure 8:
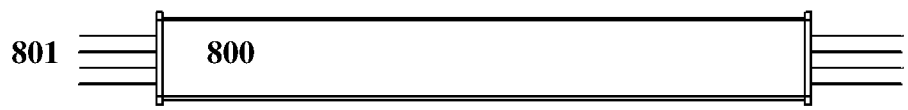
FIG. 8 schematically illustrates a horizontal view of a rectangular quartz chamber, that includes multiple substrates, which may be used in the nanotube synthesis module.
Figure 9:
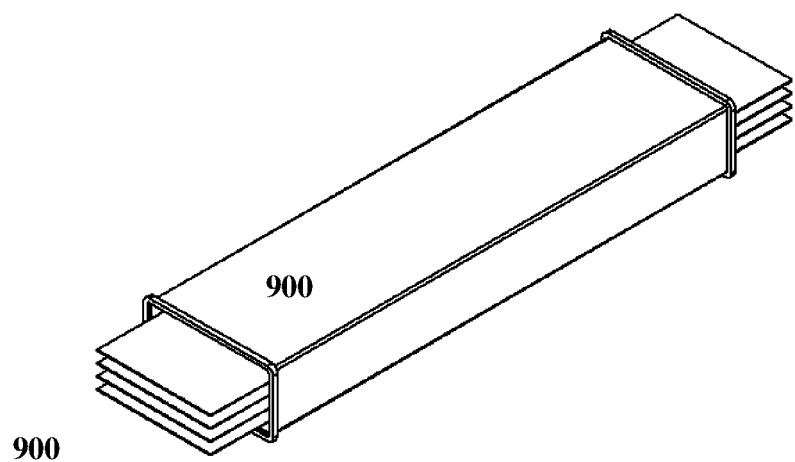
FIG. 9 illustrates a perspective view of a rectangular quartz chamber, that includes multiple substrates, which may be used in the nanotube synthesis module.

FIG. 8 illustrates a horizontal view of an exemplary rectangular quartz chamber 800, which may be used in the nanotube synthesis module that includes multiple substrates 801, which contain catalyst. FIG. 9 illustrates a perspective view of an exemplary rectangular quartz chamber 900, which may be used in the nanotube synthesis module that includes multiple substrates 901, which contain catalyst. The quartz chamber includes shower heads (not shown) for carrier gases and carbon feedstocks and may be heated at temperatures sufficient to form CNTs. In some embodiment, the chamber has inner chamber thickness of greater than 0.2 inch. In other embodiments, more than substrate is processed by the chamber simultaneously.

CNTs can be characterized by a multitude of techniques, including, for example, Raman, spectroscopy, UV, visible, near infrared spectroscopy, florescence and X-ray photoelectron spectroscopy, thermogravimetric analysis, atomic force microscopy, scanning tunneling, microcopy, scanning electron microscopy and tunneling electron microscopy. A combination of many, if not all of the above are sufficient to fully characterize carbon nanotubes.

Some examples of CNT applications include mixing of CNTs with metal or metal alloys to provide stronger and lighter body armor, mixing of CNTs with plastics and or polymers to provide thermally conductive and or electrically conductive plastics and or polymers, which have many applicability in various industries, adding CNTs to tires to increase the tire lifetime of the tires, mixing CNTs with asphalt, concrete, metals, plastics or combinations thereof to provide composite materials of higher performance and durability (e.g., superior anti-wear characteristics, improved mechanical strength, etc.) which prevent or minimize mechanical cracking of the materials and mixing CNTs with coating materials and lubricants to increase the lifetime of coated and/or lubricated equipment and structures. CNTs in addition may be used in mechanical applications, construction materials, lithium ion batteries, lubricant additives, microelectronics, supercapacitors, electrolytic capacitors, solar cells, sensors, textiles, touch screen displays, conducting wires, various medical applications (e.g., drug delivery, artificial implants, preservatives, nanoprobes, cancer therapy, gene delivery, biological imaging biosensors, etc.) and as inks.

CNT quality, particularly purity and structural uniformity, such as, for example, length of the CNTs, is essential for manufacturing regularity to consistently provide high performance and superior quality CNT-containing products. Many other uses such as for example, pharmaceutical applications and biological applications which utilize CNTs and which require CNTs of superior quality and reduced cost to maximize potential commercialization.

Finally, it should be noted that there are alternative ways of implementing the present invention. Accordingly, the present embodiments are to be considered as illustrative and not restrictive, and the invention is not to be limited to the details given herein, but may be modified within the scope and equivalents of the appended claims.

All publications and patents cited herein are incorporated by reference in their entirety.

The following examples are provided for illustrative purposes only and are not intended to limit the scope of the invention.

Example 1: Thermogravimetric Analysis of Multiwalled CNTs

Figure 10:
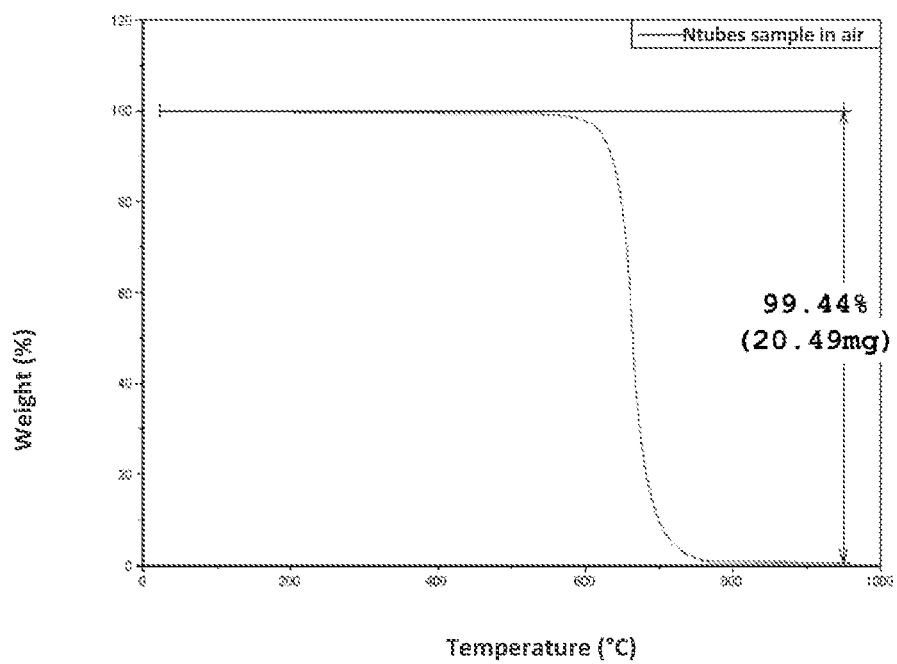
FIG. 10 illustrates TGA results which show greater than 99.4% purity for MWCNTs produced by the methods and apparatus described herein.

The carbon purity and thermal stability of CNTs were tested using a Thermogravimetric Analyzer (TGA), TA instruments, Q500. The samples were heated under air atmosphere (Praxair AI NDK) from temperature to 900° C. at a rate of 10° C./min and held at 900° C. for 10 minutes before cooling. Carbon purity is defined as (weight of all carbonaceous material)/(weight of all carbonaceous materials+weight of catalyst), The inflection point is the temperature at which thermal degradation reaches its maximum value. The onset point is the temperature at which about 10% of the material degrades owing to high temperature. FIG. 10 illustrates thermal stability data for multi-walled carbon nanotubes made by the methods and devices described herein. The multi-walled carbon nanotubes made herein have an inside diameter of about 5 nm with between 5-8 walls with a customizable length of between 10 μM and 200 μM. In the region below 400° C. is where amorphous carbon and carbonaceous materials with poor thermal resistance were degraded. As can be seen from the graph there is almost no amorphous carbon and carbonaceous materials in the multi-walled carbon nanotubes made by the methods and devices described herein. The inflection point is 721° C., the onset point is 644° C. and the carbon purity is greater than 99.4%. In contrast NC7000 (not shown), a commercially available CNT. the inflection point is 643° C., the onset point is 583° C. and the carbon purity is 90%.

Example 2: Raman Analysis of Multiwalled CNTs 10 mg of CNTs were suspended in about 100 mL of methanol to form a blackish solution. The resulting suspension was then sonicated for about 10 minutes to uniformly disperse CNTs in the suspension since a thin layer of CNTs is required for Raman spectra. The suspension was then spread over Si substrate to form a thin layer. The coated Si substrate was then placed in an oven for 10 minutes at 130° C. to vaporize the dispersing agent from the sample. Raman spectra were then recorded with a Thermos Nicolet Dispersive XR Raman Microscope with a laser radiation of 532 nm, integration of 50 s, 10× objective and a laser of 24 mW. The ratio of D and G band intensities is often used as a diagnostic tool to verify the structural perfection of CNTs.

Figure 11:
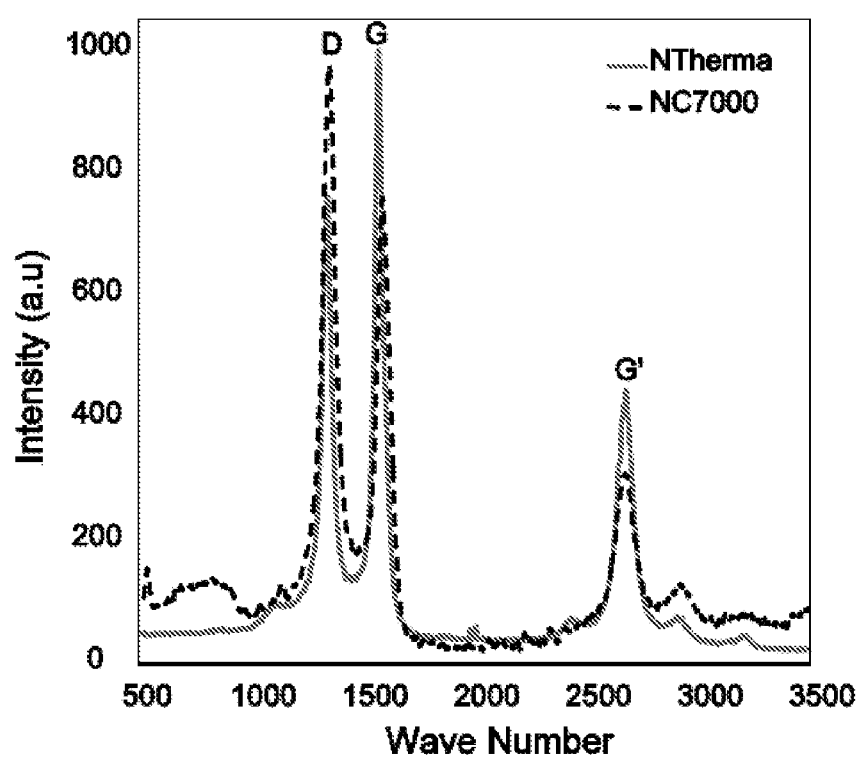
FIG. 11 illustrates Raman spectra which shows that MWCNTs produced by the methods and apparatus described herein are highly crystalline when compared to industrial grade samples.

FIG. 11 illustrates Raman spectra of multi-walled carbon nanotubes made by the methods and devices described herein (solid line) and commercially available NC7000 (dashed line). The Id/IG and the IG/IG' ratio of the multi-walled carbon nanotubes made by the methods and devices described herein are 0.76 and 0.44 respectively, while the same ratios for NC7000 are 1.27 and 0.4, respectively. The above demonstrates, the greater crystallinity of the multi-walled carbon nanotubes made by the methods and devices described herein over those produced by other methods and is in accord with the thermal stability data.

What is claimed is:

1. A method for synthesizing multi-walled carbon nanotubes consisting of:
   continuously depositing catalyst on a constantly moving substrate;
   forming multi-walled carbon nanotubes on the substrate;
   separating the multi-walled carbon nanotubes from the substrate; and
   collecting the multi-walled carbon nanotubes;
   wherein the substrate constantly moves sequentially through the depositing, forming, separating and collecting steps and the multi-walled carbon nanotubes are of greater than 95% purity.

2. The method of claim 1, wherein the multi-walled carbon nanotubes are vertically aligned.

3. The method of claim 1, wherein the multi-walled carbon nanotubes are vertically aligned and are of uniform length.

4. The method of claim 1, wherein the multi-walled carbon nanotubes are of uniform length and the uniform length is about 50 μM, about 100 μM, about 150 μM or about 200 μM.

5. The method of claim 1, wherein the multi-walled carbon nanotubes are of greater than 99% purity.

6. The method of claim 5, wherein the multi-walled carbon nanotubes are of uniform length and the uniform length is about 50 μM, about 100 μM, about 150 μM or about 200 μM.

7. The method of claim 1, wherein the multi-walled carbon nanotubes are of greater than 99.5% purity.

8. The method of claim 7, wherein the multi-walled carbon nanotubes are of uniform length and the uniform length is about 50 μM, about 100 μM, about 150 μM or about 200 μM.

9. The method claim 1, wherein the Raman spectra of the multi-walled carbon nanotubes has an $I_d/I_g$ ratio of about 0.76.

* * * * *